(12) United States Patent
Kawai et al.

(10) Patent No.: US 8,177,671 B2
(45) Date of Patent: May 15, 2012

(54) CONTROL SYSTEM FOR HYBRID DRIVE UNIT

(75) Inventors: Takashi Kawai, Gotemba (JP); Takeshi Kotani, Nisshin (JP); Junya Mizuno, Namazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 189 days.

(21) Appl. No.: 12/678,420

(22) PCT Filed: Sep. 17, 2008

(86) PCT No.: PCT/JP2008/066696
§ 371 (c)(1),
(2), (4) Date: Mar. 16, 2010

(87) PCT Pub. No.: WO2009/038058
PCT Pub. Date: Mar. 26, 2009

(65) Prior Publication Data
US 2010/0203996 A1    Aug. 12, 2010

(30) Foreign Application Priority Data
Sep. 18, 2007   (JP) ................................ 2007-241521

(51) Int. Cl.
 *F16H 3/72* (2006.01)
 *B60W 10/02* (2006.01)
(52) U.S. Cl. ............................................... 475/5; 477/5
(58) Field of Classification Search ................. 477/5
 See application file for complete search history.

(56) References Cited

U.S. PATENT DOCUMENTS

| | | | |
|---|---|---|---|
| 2001/0044683 A1 | 11/2001 | Takaoka et al. | |
| 2002/0055411 A1 | 5/2002 | Yoshiaki et al. | |
| 2003/0013569 A1 | 1/2003 | Doepke | |
| 2005/0221939 A1 | 10/2005 | Takami et al. | |
| 2007/0270262 A1* | 11/2007 | Raghavan et al. | 475/5 |
| 2007/0298924 A1* | 12/2007 | Bucknor et al. | 475/5 |
| 2008/0196955 A1* | 8/2008 | Minamikawa | 180/65.2 |
| 2009/0011887 A1 | 1/2009 | Komada et al. | |

FOREIGN PATENT DOCUMENTS

JP      2001 315552      11/2001

(Continued)

*Primary Examiner* — Edwin A Young
(74) *Attorney, Agent, or Firm* — Oblon, Spivak, McClelland, Maier & Neustadt, L.L.P.

(57) ABSTRACT

To provide a control system capable of setting a various kinds of driving mode, and shifting the driving mode regardless of the rotational speed of the engine.

The control system comprises: a power distribution mechanism having three rotary elements rotating differentially amongst each other; a speed change mechanism capable of setting a first speed change mode in which the power transmitted from the second rotary element connected with the first electric motor is outputted to an output member, and a second speed change mode in which the power transmitted from the third rotary element connected with the second electric motor is outputted to the output member; and a first speed change control means (steps S7 and S8), which sets an EV running mode by temporarily disabling the internal combustion engine to transmit the power thereof to the output member while transmitting the power outputted from any of the electric motors to the output member instead of transmitting the power of the internal combustion engine, in case of shifting the speed change mode of the speed change mechanism under a condition in which the power of the internal combustion engine is being transmitted to the output member without being converted into an electric power by the electric motors.

16 Claims, 8 Drawing Sheets

FOREIGN PATENT DOCUMENTS

| | | |
|---|---|---|
| JP | 2002 142303 | 5/2002 |
| JP | 2003 106389 | 4/2003 |
| JP | 2005 125876 | 5/2005 |
| JP | 2005 155891 | 6/2005 |
| JP | 2005 170227 | 6/2005 |
| JP | 2005 297786 | 10/2005 |

* cited by examiner

|  |  | C1 | C2 | C3 | C4 | C5 | B1 |
|---|---|---|---|---|---|---|---|
| ENG RUNNING | 1st CVT | O | × | × | O | O | × |
|  | 1st+2nd Fixed | O | O | × | O | O | × |
|  | 2nd CVT | × | O | × | O | O | × |
|  | 2nd+3rd Fixed | × | O | O | O | O | × |
|  | 3rd CVT | × | (O) | O | × | O | × |
|  | 3rd MG1 Lock | × | (O) | O | × | O | O |
| EV RUNNING | 1st | O | × | × | O | × | × |
|  | 2nd | × | O | × | O | × | × |
|  | 3rd | × | (O) | O | × | × | × |

CONTROL SYSTEM FOR HYBRID DRIVE UNIT

TECHNICAL FIELD

This invention relates to a control system for controlling a hybrid drive unit comprising an internal combustion engine and at least two electric motors. More particularly, this invention relates to a control system for carrying out a control for shifting a driving mode or a speed change mode of the hybrid drive unit.

BACKGROUND ART

The control system of this kind is adapted not only to control the internal combustion engine and the electric motor to output power, or to use the electric motor to output the power instead of the internal combustion engine, but also to control a rotational speed of the internal combustion engine using the electric motor thereby driving the internal combustion engine at an optimum fuel economy. For example, the power outputted from the internal combustion engine is distributed to the electric motor side and an output shaft side by a differential mechanism, and a torque of the output shaft side is increased by a reaction resulting from using the electric motor as a generator. The generated electric power is utilized to drive a vehicle. According to the hybrid drive unit thus structured, the power outputted from the internal combustion engine has to be converted into the electric power. Therefore, if an amount of such power conversion is increased, a power loss resulting from the power conversion is thereby increased. In order to avoid such disadvantage, according to the prior art, a power transmission mode of the drive unit, that is, a driving mode (or running mode) is shifted according a driving condition.

For example, Japanese Patent Laid-Open No. 2005-125876 discloses a hybrid vehicle driving device. Specifically, according to the teachings of Japanese Patent Laid-Open No. 2005-125876, the hybrid vehicle driving device comprises an input element to which an internal combustion engine is connected, a reaction force element to which a first motor/generator is connected, a power distribution mechanism for performing a differential action having an output element connected to a second motor/generator, and two clutches for connecting an output member selectively with the output element and the reaction force element. Therefore, according to the hybrid vehicle driving device taught by Japanese Patent Laid-Open No. 2005-125876, the engine torque is outputted to the output member while being amplified by the power distribution mechanism, and the driving mode is shifted between a driving mode in which a speed change ratio is varied continuously and a driving mode in which a vehicle is driven by using any of the motor/generators as a prime mover.

According to the teachings of Japanese Patent Laid-Open No. 2005-125876, the driving mode (or running mode) is changed according to an engagement status of the two clutches. Therefore, the rotational speeds and power transmission efficiencies of the engine and the motor/generators can be optimized by engaging or disengaging the clutches in accordance with a driving condition of the vehicle such as an opening degree of an accelerator or a speed of the vehicle. However, the vehicle may be kept driven by the power of the engine during a mode change. In addition, in case of arranging a speed change mechanism for the purpose of diversifying the driving modes, the vehicle may also be kept driven by the power of the engine during a mode change executed by carrying out a speed change of the speed change mechanism. In those cases, an operating condition of the engine, that is, as an operating point of the engine is governed by a speed of the vehicle, drive demand etc. This means that the operating condition of the engine may become unacceptable condition. For example, the rotational speed of the engine may be lowered to the speed lower than a predetermined allowable speed, otherwise, the operating condition of the engine may enter into an operating range where noise or vibration exceeds an allowable level. In such cases, the operational point of the engine has to be changed compulsory if the mode is not changed. As a result, fuel consumption may be degraded, or acceleration and deceleration caused by such change in the operational point of the engine bring an uncomfortable feeling.

DISCLOSURE OF THE INVENTION

The present invention has been conceived noting the technical problems thus far described, and its object is to provide a control system for a hybrid drive unit capable of shifting a speed change condition or a speed change mode of a speed change mechanism, even in case an operating condition of an internal combustion engine may go beyond an allowable range.

In order to achieve the above-mentioned object, according to the present invention, there is provided a control system for a hybrid drive unit having an internal combustion engine, and first and second electric motors capable of generating electric power, characterized by comprising: a power distribution mechanism comprising three rotary elements rotated differentially amongst each other including a first rotary element to which a power of the internal combustion engine is transmitted, a second rotary element to which a power of the first electric motor is transmitted, and a third rotary element to which a power of the second electric motor is transmitted; a speed change mechanism capable of setting a first speed change mode in which the power transmitted from the second rotary element is outputted to an output member, and a second speed change mode in which the power transmitted from the third rotary element is outputted to the output member; and a first speed change control means, which sets an electric vehicle (EV) running mode by temporarily disabling the internal combustion engine to transmit the power thereof to the output member while transmitting the power outputted from any of the electric motors to the output member instead of transmitting the power of the internal combustion engine, in case of shifting the speed change mode of the speed change mechanism under a condition in which the power of the internal combustion engine is being transmitted to the output member without being converted into an electric power by the electric motors.

According to the present invention, the control system for a hybrid drive unit further comprises: a second speed change control means, which keeps the internal combustion engine being driven in case of shifting the speed change mode of the speed change mechanism under the condition in which the power of the internal combustion engine is being transmitted to the output member without being converted into an electric power by the electric motors; and a selecting means, which selects one of the first speed change control means and the second speed change control means to shift the speed change mode, on the basis of a driving condition of the hybrid drive unit.

According to the present invention, the control system for a hybrid drive unit further comprises a detecting means, which detects a fact that an operating condition of the internal combustion engine goes beyond a predetermined allowable vibrational noise range, or a fact that a rotational speed of the internal combustion engine becomes lower than a predetermined allowable lowest rotational speed, in case of shifting the speed change mode of the speed change mechanism under a condition in which the power of the internal combustion engine is being transmitted to the output member without being converted into an electric power by the electric motors. The aforementioned selecting means includes a means which selects the first speed change control means to shift the speed change mode, in case the detecting means detects the fact that the driving condition of the internal combustion engine goes beyond the predetermined allowable vibrational noise range or the fact that the rotational speed of the internal combustion engine becomes lower than the predetermined allowable lowest rotational speed, when shifting the speed change mode of the speed change mechanism under the condition in which the power of the internal combustion engine is being transmitted to the output member without being converted into an electric power by the electric motors.

The power distribution mechanism is a double pinion type planetary gear mechanism comprising: a first sun gear as an external gear, to which the power of the first electric motor is transmitted; a first ring gear as an internal gear, which is arranged concentrically with the first sun gear, and to which the power of the internal combustion engine is transmitted; and a first carrier, which holds a pinion gear meshing with the first sun gear and an another pinion gear meshing with the pinion gear and the first ring gear, and to which the power of the second electric motor is transmitted. Meanwhile, the aforementioned speed change mechanism comprises: a single pinion type planetary gear mechanism comprising a second sun gear as an external gear, a second ring gear which is arranged fixedly and concentrically with the second sun gear, and a second carrier which holds a pinion gear meshing with the second sun gear and the second ring gear; a first clutch, which connects the second sun gear selectively with the first carrier; a second clutch, which connects the second sun gear selectively with the first electric motor; a third clutch, which connects the second carrier selectively with the output member; a fourth clutch, which connects the second carrier selectively with the output member; a fifth clutch, which connects the first electric motor selectively with the first sun gear; and a brake, which halts the first electric motor selectively.

According to the present invention, the internal combustion is disabled to transmit the power thereof to the output member by halting combustion of fuel, or by disconnecting a transmission of the torque between the internal combustion engine and the output member.

In addition, the first speed change control means includes a means which disconnects the first electric motor from the first sun gear by disengaging the fifth clutch.

The control system for a hybrid drive unit further comprises: a clutch, which connects any one of the second rotary element and the third rotary element selectively with the speed change mechanism; and an another clutch, which connects the remaining second or third rotary element selectively with the speed change mechanism or the output member.

Thus, in the hybrid drive unit, the speed change mode of the speed change mechanism may be shifted under the condition in which the power of the internal combustion engine is being transmitted to the output member without being converted into an electric power by the electric motors. However, according to the present invention, the speed change mode of the speed change mechanism can be shifted under the condition achieved by the first speed change control means, in which the internal combustion engine is disabled to transmit the power thereof to the output member, and in which the power of the electric motor is transmitted to the output member instead of the power of the internal combustion engine. That is, the speed change mode of the speed change mechanism will not affect an operating condition of the internal combustion engine, in other words, the shifting of the speed change mode of the speed change mechanism will not be restricted by the operating condition of the internal combustion engine. Therefore, the speed change mode of the speed change mechanism is allowed to be shifted. For this reason, the operating condition of the internal combustion engine will not be varied beyond the predetermined allowable range, so that increases in noise and vibration, as well as deteriorations in uncomfortable feeling and fuel consumption can be avoided or prevented.

BEST MODE FOR CARRYING OUT THE INVENTION

Figure 1:
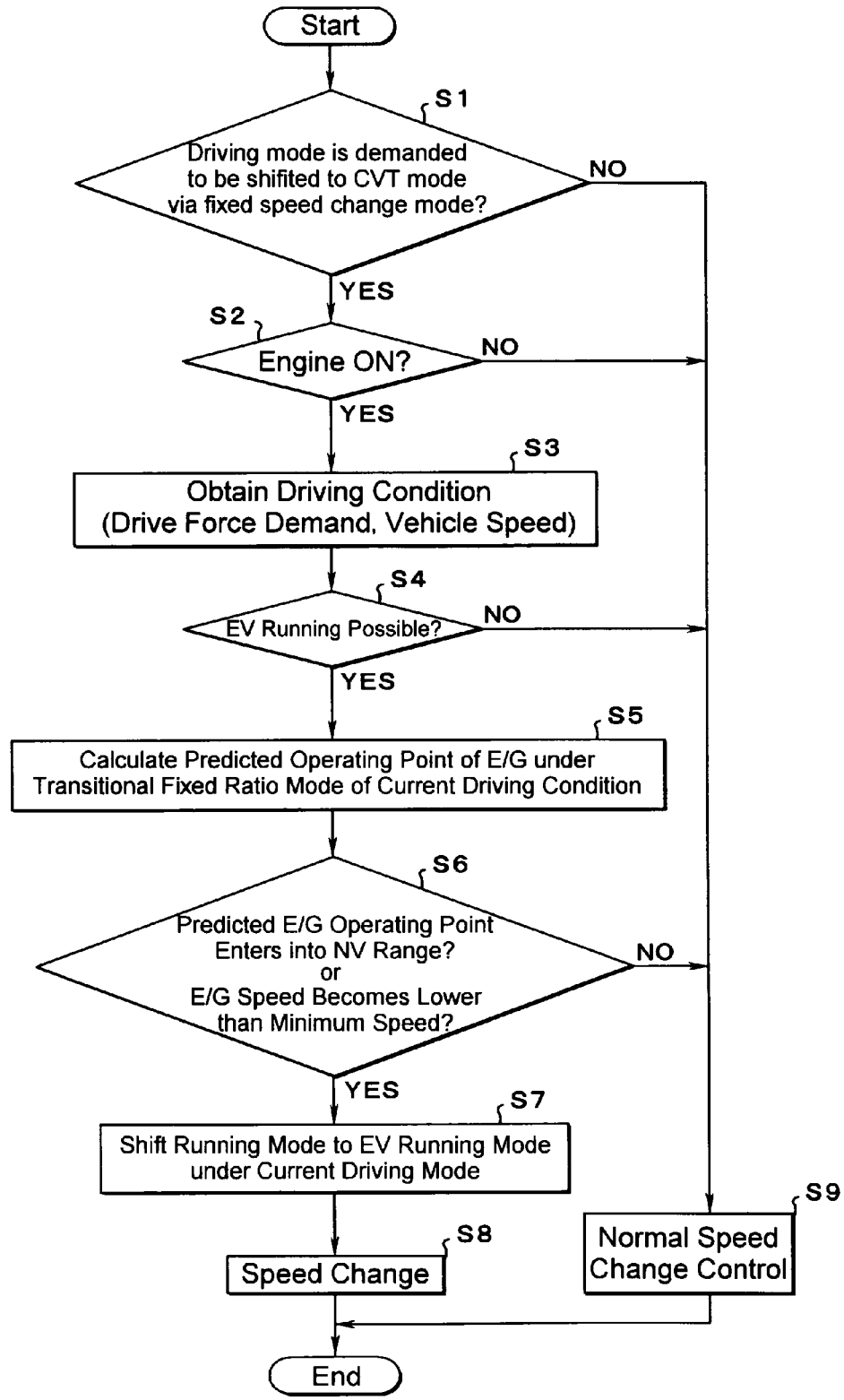
FIG. 1 is a flowchart explaining an example of a control to be carried out by the control system of the present invention.

Next, this invention will be described in connection with its specific examples. The hybrid drive unit to which the present invention is applied comprises an internal combustion engine and at least two electric motors as prime movers. Specifically, the internal combustion engine is a thermal engine adapted to output thermal energy generated by combusting fuel in the form of mechanical energy such as a gasoline engine, a diesel engine, a gas engine using gas as fuel. Meanwhile, the electric motor is adapted not only to output mechanical energy in case it is driven by feeding an electric power thereto but also to generate electromotive force in case it is rotated compulsory by an external force. For example, a permanent magnet type synchronous motor can be used.

Those internal combustion engine and electric motors are connected with a power distribution mechanism. Specifically, the power distribution mechanism is adapted to distribute the power outputted from the internal combustion engine to any one of the electric motor and to an output side. According to the present invention, a differential mechanism comprising at least three rotary elements to be rotated differentially among each other, for example, a double pinion type planetary gear mechanism, a single pinion type planetary gear mechanism, or a planetary roller mechanism may be used as the power distribution mechanism. The internal combustion engine is connected with a first rotary element of the power distribution mechanism in a manner to transmit the power thereof. In addition, the internal combustion engine may be connected with the first rotary element not only directly but also indirectly through a transmission mechanism such as a clutch, a fluid coupling or the like. The aforementioned electric motors are individually connected with a second rotary element and a third rotary element. Likewise, the electric motors may be connected with the second or the third rotary element not only directly but also indirectly through a transmission mechanism such as a clutch or the like. Additionally, a speed reducing mechanism may be interposed between any of the electric motors and the second or the third rotary element. In this case, a smaller electric motor the output torque thereof is smaller may be used.

According to the present invention, the hybrid drive unit further comprises a speed change mechanism. The speed change mechanism is interposed between the power distribution mechanism and the output member, and adapted to output the power inputted thereto to the output member while carrying out a speed change or without carrying out a speed change. In addition, the speed change mechanism is capable of setting at least two speed change modes. Specifically, the speed change mechanism is adapted to set a speed change mode in which a power inputted to the speed change mechanism from any one the second and the third rotary element is outputted to the output member while carrying out a speed change or carrying out a speed change, and a speed change mode in which a power inputted to the speed change mechanism from the other rotary element is outputted to the output member while carrying out a speed change or without carrying out a speed change.

In order to shift the speed change mode of the transmission, that is, to control a speed change operation, the control system is provided with a first speed change control means. The first speed change control means is adapted to set an electric vehicle (EV) running mode in case of shifting the speed change mode of the speed change mechanism under a condition in which the power outputted from the internal combustion engine is transmitted to the output member without being converted into an electric power by the electric motors. Under the EV running mode, the internal combustion is disabled to transmit the power thereof to the output member, and the power of at least any one of the electric motor is transmitted to the output member instead of the power of the internal combustion engine which has been transmitted to the output member. That is, in case the hybrid drive unit according to the present invention is mounted on a vehicle, the vehicle is driven by the power of the electric motor under the EV running mode.

Thus, in case of shifting the speed change mode of the speed change mechanism under the condition in which the power outputted from the internal combustion engine is transmitted to the output member without being converted into an electric power by the electric motors, the internal combustion engine is temporarily disabled to transmit the power thereof to the output member even if the internal combustion engine is connected with the output member directly by a mechanical means such as the speed change mechanism. That is, since the internal combustion engine is not outputting the torque, uncomfortable feeling resulting from deteriorations in vibrations and noise can be prevented or avoided even if a rotational speed of the internal combustion engine is lowered in relation to a rotational speed of the output member or a speed change ratio of the speed change mechanism. Especially, the rotational speed of the internal combustion engine can be kept to an appropriate speed, e.g., to an idling speed regardless of the rotational speed of the output member and the speed change ratio of the speed change mechanism, by disconnecting the internal combustion engine from the output shaft. Therefore, the speed change mode can be shifted without being restricted by the rotational speed of the internal combustion engine.

According to the preferable embodiment of the present invention, the control system of the hybrid drive unit further comprises: a second speed change control means, which carries out a shifting of the speed change mode of the speed change mechanism under the condition in which the power of the internal combustion engine is being transmitted to the output member without being converted into an electric power by the electric motors; and a selecting means, which selects one of the first speed change control means and the second speed change control means to shift the speed change mode, in accordance with a driving condition of the hybrid drive unit. Therefore, in case a drop in the rotational speed of the internal combustion engine or the like as the cause of uncomfortable feeling is not expected to occur, the speed change mode can be shifted by the second speed change control means. Thus, in addition to the above explained advantage, a controllability of the hybrid drive unit can be improved by decreasing frequency of inactivating the internal combustion engine temporarily on the occasion of shifting the speed change mode of the speed change mechanism.

Especially, according to the preferable embodiment of the present invention, the speed change mode of the speed change mechanism is shifted by the first speed change control means, in case the detecting means detects the fact that the operating condition of the internal combustion engine goes beyond the predetermined allowable vibrational noise range, or the fact that the rotational speed of the internal combustion engine becomes lower than the predetermined allowable lowest rotational speed, when shifting the speed change mode of the speed change mechanism under the condition in which the power of the internal combustion engine is being transmitted to the output member without being converted into an electric power by the electric motors. Therefore, according to the present invention, the noise and vibrations will not be deteriorated, and the rotational speed of the internal combustion engine will not be dropped excessively.

As explained, according to the preferable embodiment of the present invention, the power distribution mechanism is a double pinion type planetary gear mechanism. On the other hand, the speed change mechanism is composed mainly of a single pinion type planetary gear mechanism and the first to forth clutches, and the speed change mechanism further comprises the fifth clutch for connecting the first electric motor selectively with the first sun gear of the power distribution mechanism, and a brake for halting the first electric motor selectively. Specifically, a frictional engagement mechanism and a meshing type engagement mechanism may be used as those clutches and brake. In case of using the meshing type engagement mechanism as the clutches and brake, no specific power is required to keep engaging or disengaging the clutches and the brake. Therefore, an energy loss in the hybrid drive unit can be reduced entirely. In addition, by disengaging the fifth clutch, a power transmission between the internal combustion engine and the output member can be interrupted, in other words, the internal combustion engine can be disabled to transmit the power thereof to the output member.

As also described, the hybrid drive unit further comprises: the clutch for connecting any one of the second rotary element and the third rotary element selectively with the speed change mechanism; and another clutch for connecting the remaining second or third rotary element selectively with the speed change mechanism or the output member. Therefore, in case of shifting the speed change mode between the speed change mode in which the power is outputted to the output member through the speed change mechanism, and the speed change mode in which the power is outputted to the output member without letting the power through the speed change mechanism, such shifting operation will not be restricted by the rotational speed of the internal combustion engine.

Figure 4:
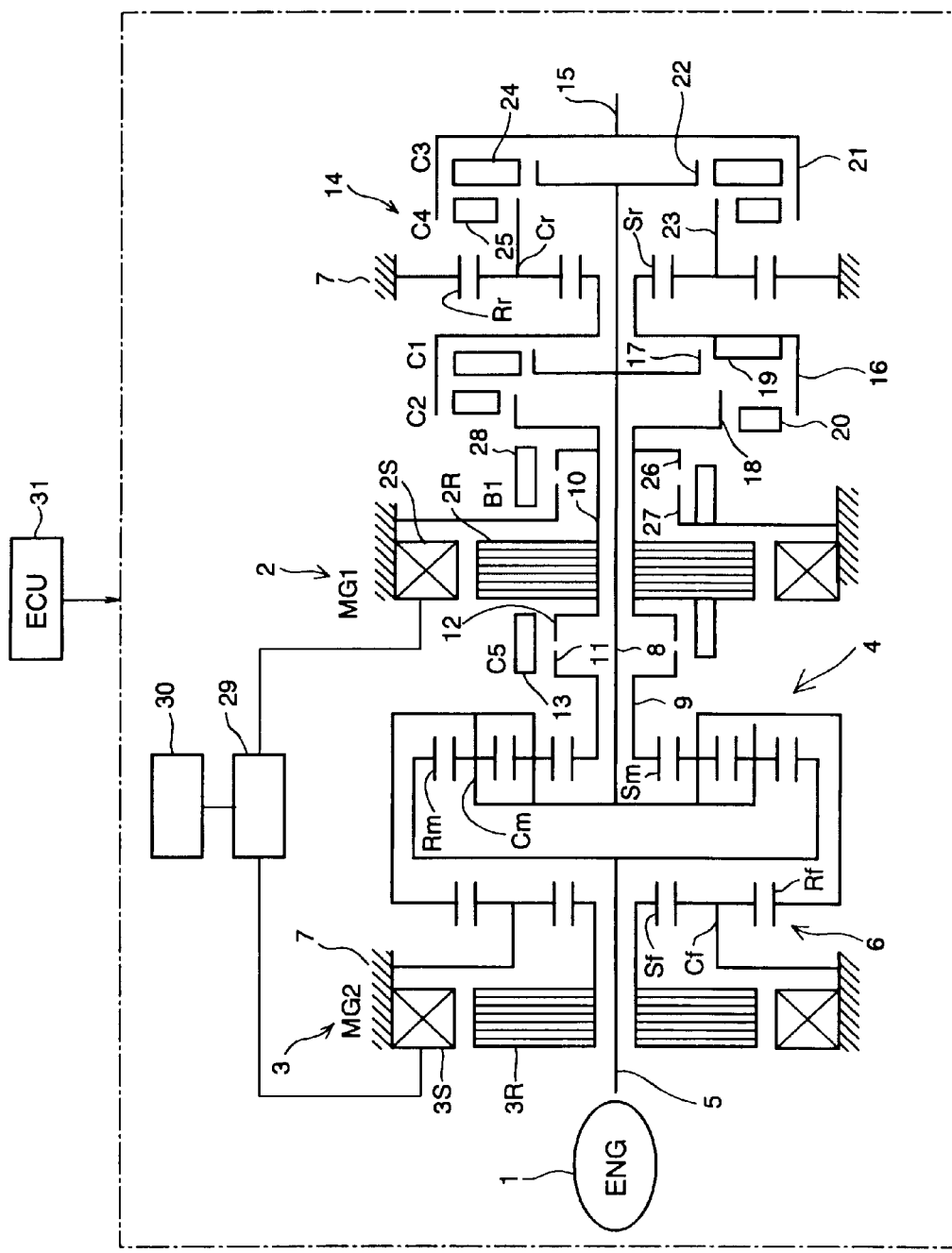
FIG. 4 is a skeleton diagram schematically showing an example of the hybrid drive unit to which the present invention is applied.

Here will be explained an example of the present invention including preferable embodiments thus has been explained. FIG. 4 is a skeleton diagram schematically showing an example of the hybrid drive unit to which the present invention is applied. As shown in FIG. 4, the hybrid drive unit comprises an internal combustion engine (as will be called an engine hereinafter) 1, and two motor generators (abbreviated as MG1 and MG2) 2 and 3 corresponding to the electric motor of the present invention. Those engine 1, and the motor generators 2 and 3 serve as the prime mover of the hybrid drive unit. Specifically, the engine 1 is connected with a power distribution mechanism 4. On the other hand, the motor generators 2 and 3 are individually adapted to transmit a torque between the power distribution mechanism 4 and each motor generator 2 and 3, thereby establishing a reaction against the power distribution mechanism 4 or assisting the torque to be outputted. Additionally, a (not shown) dumper or a (not shown) torque converter may be interposed between the engine and the power distribution mechanism.

In the example shown in FIG. 4, a double pinion type planetary gear mechanism is used as the power distribution mechanism 4. Specifically, the power distribution mechanism 4 comprises: a sun gear Sm as an external gear; a ring gear Rm as an internal gear arranged concentrically with the sun gear Sm; and a carrier Cm holding a pinion gear meshing with the sun gear Sm in a rotatable and revolvable manner, and holding another pinion gear meshing with said pinion gear and the ring gear Rm in a rotatable and revolvable manner. That is, the power distribution mechanism 4 is a differential gear mechanism adapted to perform a differential action by rotating the above-explained three rotary elements differentially among each other. According to the example shown in FIG. 4, the power of the engine 1 is transmitted to the ring gear Rm. Accordingly, the ring gear Rm corresponds to the first rotary element of the present invention. As shown in FIG. 4, the sun gear Sm is connected with one of the motor generators (as will be called a first motor generator) 2. Accordingly, the sun gear Sm corresponds to the second rotary element of the present invention. As also shown in FIG. 4, the carrier Cm is adapted to transmit the torque between the carrier Cm and the other motor generator (as will be called a second motor generator) 3. Accordingly, the carrier Cm corresponds to the third rotary element of the present invention.

The motor generators 2 and 3, and the power distribution mechanism 4 are arranged coaxially with an input shaft 5 for inputting the power of the engine 1 to the ring gear Rm, and the second motor generator (MG2) 3 is situated closer to the engine 1 than the power distribution mechanism 4. Between the second motor generator 3 and the power distribution mechanism 4, there is arranged a speed reducing mechanism 6. The speed reducing mechanism 6 is adapted to transmit the torque outputted from the second motor generator 3 to the power distribution mechanism 4 while amplifying the torque. Specifically, the speed reducing mechanism 6 is a gear mechanism or a roller mechanism or the like whose speed change ratio or speed reducing ratio is larger than "1". More specifically, in the example shown in FIG. 4, a single pinion type planetary gear mechanism is used as the speed reducing mechanism 6, and the speed reducing mechanism 6 is arranged around and coaxially with the input shaft 5. The single pinion type planetary gear mechanism comprises: a sun gear Sf as an external gear; a ring gear Rf as an internal gear arranged concentrically with the sun gear Sf; and a carrier Cf holding a pinion gear meshing with the sun gear Sf and the ring gear Rf in a rotatable and revolvable manner. That is, the speed reducing mechanism 6 is a gear mechanism in which those three rotary elements are rotated differentially among each other. Here, a mechanism in which rollers are employed instead of those gears is a planetary roller mechanism.

A stator 3S of the second motor generator 3 is fixed with a fixing member 7 such as a (not shown) casing, and a rotor 3R arranged in an inner circumferential side of the stator 3S is connected with a sun gear Sf. In addition, the second motor generator 3 further comprises a (not shown) sensor such as a resolver adapted to detect a phase of the rotor 3R and to output a signal thereof. Accordingly, the sun gear Sf serves as an input element. The carrier Cf is connected and fixed with the fixing member 7, accordingly, the carrier Cf serves as a fixing element. Meanwhile, the ring gear Rf is connected with the carrier Cm of the power distribution mechanism 4 and serves as an output element. Therefore, provided that a gear ratio between the teeth number of the sun gear Sf and the teeth number of the ring gear Rf is "$\rho$" (<1), a rotational speed of the ring gear Rf is reduced in accordance with the gear ratio, and a torque inputted to the sun gear Sf is amplified in accordance with the gear ratio "$\rho$" and inputted to the ring gear Rf.

An intermediate shaft 8 is arranged to penetrate the center of the power distribution mechanism 4 and coaxially with the input shaft 5. Specifically, the intermediate shaft 8 is arranged on an extension of the input shaft 5, and connected with the carrier Cm to output the power from the power distribution mechanism 4. The first motor generator (MG1) 2 is arranged around the intermediate shaft 8 and coaxially therewith. A stator 2S of the first motor generator 2 is fixed with the fixing member 7, and a clutch (as will be tentatively called a fifth clutch) C5 is provided to connect the rotor 2R arranged in an inner circumferential side of the first motor generator 2 selectively with the sun gear Sm functioning as a first element of the power distribution mechanism 4. For example, an appropriate clutch mechanism such as a frictional clutch, a positive clutch and so on can be used as the fifth clutch C5, and in the example shown in FIG. 4, a dog clutch is used as the fifth clutch C5.

A configuration of the fifth clutch C5 will be explained in more detail. As shown in FIG. 4, the sun gear Sm of the power distribution mechanism 4 is attached to the fifth clutch C5. More specifically, a sun gear shaft 9 on which the sun gear Sm is formed is arranged on an outer circumferential side of the intermediate shaft 8 in a manner to rotate relatively therewith, and a rotor shaft 10 integrated with the rotor 2R of the first motor generator 2 is arranged coaxially with the sun gear shaft 9. A hub 11 is formed integrally with the sun gear shaft 9 at an end portion of the sun gear shaft 9 being opposed to an end portion of the rotor shaft 10, and a hub 12 is formed integrally with the rotor shaft 10 at the end portion of the rotor shaft 10 being opposed to the end portion of the sun gear shaft 9. That is, the hub 11 and the hub 12 are adjacent to each other, and those hubs 11 and 12 are individually provided with a spline on its outer circumferential face. In addition, there is provided a sleeve 13 which is adapted to be splined to those hubs 11 and 12 when it is moved by a not shown actuator in its axial direction.

Thus, the fifth clutch C5 is adapted to connect the sun gear Sm with the rotor 2R of the first motor generator 2 in a manner to transmit the torque therebetween by moving the sleeve 13 in the axial direction to a position to be splined to both of the hubs 11 and 12, and to disconnect the sun gear Sm from the rotor 2R of the first motor generator 2 by moving the sleeve 13 in the axial direction to a position to be splined to only one of the hubs 11 and 12. In case the fifth clutch C5 is disengaged to disconnect the sun gear Sm from the rotor 2R of the first motor generator 2, the sun gear Sm of the power distribution mechanism 4 becomes free state in which the sun gear Sm is not connected with any members. In this situation, the sun gear Sm idles even if the torque of the engine 1 is inputted to the ring gear Rm, therefore, the torque of the engine 1 will not appear on the carrier Cm.

A speed change mechanism 14 is arranged on the intermediate shaft 8 in an opposite side of the power distribution mechanism 4 across the first motor generator 2. The speed change mechanism 14 is adapted to output the power to an output shaft 5 arranged on an extension of the intermediate shaft 8 while carrying out a speed change. Specifically, the speed change mechanism 14 is adapted to change a ratio between an input rotational speed and an output rotational speed among a plurality of ratios. For example, a mechanism adapted to perform a differential action such as a planetary gear mechanism, a planetary roller mechanism or the like can be used as the speed change mechanism 14. In the example shown in FIG. 4, a single pinion type planetary gear mechanism is used as the speed change mechanism 14.

Thus, a known single pinion type planetary gear mechanism is used as the speed change mechanism 14. That is, as the aforementioned speed reducing mechanism 6, the single pinion type planetary gear mechanism comprises a sun gear Sr, a ring gear Rr, and a carrier Cr, and those rotary elements are adapted to be rotated differentially among each other. Specifically, the ring gear Rr is fixed with the fixing member 7 to serve as a fixing member, the carrier Cr is adapted to be connected selectively with the output member 15 to serve as an output member, and the carrier Cr serves as an input member.

In order to set a plurality of speed change mode of the speed change mechanism 14, or to set a plurality of input and output condition of the speed change mechanism 14, there are provided a plurality of clutches. Specifically, a first clutch C1 and a second clutch C2 are arranged to switch an input condition, and a third clutch C3 and a fourth clutch C4 are arranged to switch an output condition to the output member 15. The first clutch C1 is adapted to connect the sun gear Sr selectively with the intermediate shaft 8, and the second clutch C2 is adapted to connect the sun gear Sr selectively with the rotor shaft 10 of the first motor generator 2. In short, those clutches C1 to C4 are adapted to transmit and interrupt the torque selectively, and a frictional clutch, a positive clutch or the like can be used as those clutches C1 to C4. In the example shown in FIG. 4, dog clutches are used as the clutches C1 to C4.

The sun gear Sr of the speed change mechanism 14 is integrated with a cylindrical portion 16 having a spline on its inner circumferential face, and a hub 17 integrated with the intermediate shaft 8 and a hub 18 integrated with the rotor shaft 10 of the first motor generator 2 are axially juxtaposed in an inner circumferential side of the cylindrical portion 16. The hub 17 and the hub 18 are individually provided with a spline on its outer circumferential face. Between an outer circumferential face of the hub 17 integrated with the intermediate shaft 8 and an inner circumferential face of the cylindrical portion 16, a sleeve 19 is arranged to be splined to those hub 17 and cylindrical portion 16 when moved in the axial direction. Specifically, the sleeve 19 is adapted to connect the intermediate shaft 8 with the sun gear Sr in a manner to transmit the torque therebetween, when it is moved axially by a not shown actuator to be splined to both of the hub 17 and the cylindrical portion 16. In case the sleeve 19 is splined only to one of the hub 17 and the cylindrical portion 16, the intermediate shaft 8 is disconnected from the sun gear Sr.

On the other hand, between an outer circumferential face of the hub 18 integrated with the rotor shaft 10 and the inner circumferential face of the cylindrical portion 16, a sleeve 20 is arranged to be splined to those hub 18 and cylindrical portion 16 when moved in the axial direction. Specifically, the sleeve 20 is adapted to connect the rotor shaft 10 with the sun gear Sr in a manner to transmit the torque therebetween, when it is moved axially by a not shown actuator to be splined to both of the hub 18 and the cylindrical portion 16. In case the sleeve 20 is splined only to one of the hub 18 and the cylindrical portion 16, the rotor shaft 10 is disconnected from the sun gear Sr.

The output member 15 comprises a cylindrical portion 21 extending toward the planetary gear mechanism functioning as the speed change mechanism 14. A hub 22 arranged at a leading end of the intermediate shaft 8 and a hub 23 integrated with the carrier Cr of the planetary gear mechanism functioning as the speed change mechanism 14 are axially juxtaposed in an inner circumferential side of the cylindrical portion 21. The hub 22 and the hub 23 are individually provided with a spline on its outer circumferential face. Between an outer circumferential face of the hub 22 integrated with the intermediate shaft 8 and an inner circumferential face of the cylindrical portion 21, a sleeve 24 is arranged to be splined to those hub 22 and cylindrical portion 21 when moved in the axial direction. Specifically, the sleeve 24 is adapted to connect the intermediate shaft 8 with the output member 15 in a manner to transmit the torque therebetween, when it is moved axially by a not shown actuator to be splined to both of the hub 22 and the cylindrical portion 21. In case the sleeve 24 is splined only to one of the hub 22 and the cylindrical portion 21, the intermediate shaft 8 is disconnected from the output member 15.

On the other hand, between an outer circumferential face of the hub 23 integrated with the carrier Cr and the inner circumferential face of the cylindrical portion 21, a sleeve 25 is arranged to be splined to those hub 23 and cylindrical portion 21 when moved in the axial direction. Specifically, the sleeve 25 is adapted to connect the carrier Cr with the output member 15 in a manner to transmit the torque therebetween, when it is moved axially by a not shown actuator to be splined to both of the hub 23 and the cylindrical portion 21. In case the sleeve 25 is splined only to one of the hub 23 and the cylindrical portion 21, the carrier Cr is disconnected from the output member 15.

In addition, in order to use the power distribution mechanism 4 as a speed increasing mechanism, there is provided a brake B1 for halting the sun gear Sm selectively. Specifically, the brake B1 is an engagement mechanism adapted to halt a rotation of the rotor shaft 10 in case it is engaged, and to unlock the rotor shaft 10 in case it is disengaged. For example, an appropriate brake mechanism such as a frictional type, a meshing type and so on can be used as the brake B1. In the example shown in FIG. 4, a meshing type brake is used as the brake B1, and a hub 26 integrated with the rotor shaft 10 and a hub 27 fixed with the fixing member 7 such as a casing are axially and closely juxtaposed to each other. The hub 26 and the hub 27 are individually provided with a spline on its outer circumferential face, and a sleeve 28 is arranged to be splined to the hubs 26 and 27 when it is reciprocated by a not shown actuator. That is, the brake B1 is adapted to halt the rotor shaft 10 by splining the sleeve 28 to the hubs 26 and 27. In this case, the aforementioned fifth clutch C5 is engaged to halt the sun gear Sm substantially. To the contrary, in case the sleeve 28 is splined only to one of the hubs 26 and 27, the rotor shaft 10 is not halted so that the sun gear Sm to be connected with the rotor shaft 10 through the fifth clutch C5 is unlocked.

The aforementioned motor generators 2 and 3 are connected with an electric storage device 30 such as a battery through a controller 29 such as an inverter. That is, the motor generators 2 and 3 are controlled by the controller 29 to be driven as a motor or to be used as a generator. In addition, an electronic control unit (ECU) 31 is provided to control output torques and generation amounts (i.e., reaction forces) of the motor generators 2 and 3, and to control the speed change mode or driving mode achieved by actuating the clutches C1 to C5 and the brake B1. The electronic control unit 31 is composed mainly of a microcomputer, and adapted to carry out a calculation using input data such as a vehicle speed, a drive demand, a state of charge (SOC) of the electric storage device 30 etc., and data stored in advance. The electronic control unit 31 outputs the calculation result to the controller 29 in the form of a command signal thereby controlling the motor generators 2 and 3, or activating any of the clutches C1 to C5 and the brake B1 to set a desired driving mode or gear stage.

Figures 5, 6:
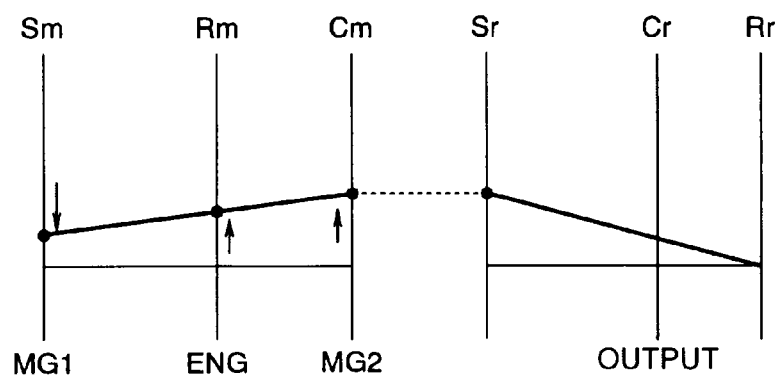
FIG. 5 is a table showing engagement states of the clutches and brake under each mode.
FIG. 6 is a nomographic diagram indicating an operating condition under the 1st CVT mode.

In case of mounting the hybrid drive unit thus has been explained on a vehicle, the vehicle is allowed to set various kinds of driving modes or gear stages. FIG. 5 is a table showing engagement states of the clutches C1 to C5 and brake B1 under each driving mode or gear stage to be set. In FIG. 5, "ENG running" represents a driving mode in which a vehicle is driven by the power outputted from the engine 1, and "EV running" represents a driving mode in which the engine 1 does not output the power and the vehicle is driven by the powers outputted from the motor generators 2 and 3.

In the category of ENG running mode, "1st CVT" represents a driving mode, in which the power is inputted to the speed change mechanism 14 from the carrier Cm of the power distribution mechanism 4 corresponding to the third rotary element of the present invention, and in which the rotational speed of the engine 1 is controlled by the first motor generator 2. Therefore, a total speed change ratio is varied continuously under the 1st CVT mode. Similarly, "2nd CVT" represents a driving mode, in which the power is inputted to the speed change mechanism 14 from the sun gear Sm of the power distribution mechanism 4 corresponding to the second rotary element of the present invention, and in which the rotational speed of the engine 1 is controlled by the second motor generator 3. Therefore, the total speed change ratio is varied continuously under the 2nd CVT mode. Further, "3rd CVT" represents a driving mode, in which the power outputted from the carrier Cm is transmitted directly to the output member 15 while controlling the rotational speed of the engine 1 by the first motor generator 2. Therefore, the total speed change ratio is varied continuously under the 3rd CVT mode. Meanwhile, "1st+2nd fixed" mode is a common driving mode between the 1st CVT mode and the 2nd CVT mode, in other words, "1st+2nd fixed" mode is a synchronized state of the 1st CVT mode and the 2nd CVT mode. Similarly, "2nd+3rd fixed" mode is a common driving mode between the 2nd CVT mode and the 3rd CVT mode, in other words, "2nd+3rd fixed" mode is a synchronized state of the 2nd CVT mode and the 3rd CVT mode. Further, "3rd MG1 lock" represents a driving mode in which the power outputted from the carrier Cm is transmitted directly to the output member 15 while halting the first motor generator 2 and the sun gear Sm connected therewith by the brake B1.

On the other hand, in the category of EV running mode: "1st" represents a driving mode, in which the second motor generator 3 is connected with the speed change mechanism 14, and the vehicle is driven by the second motor generator 3; "2nd" represents a driving mode, in which the first motor generator 2 is connected with the speed change mechanism 14, and the vehicle is driven by the first motor generator 2; and "3rd" represents a driving mode, in which the second motor generator 3 is connected directly with the output member 15, and the vehicle is driven by the second motor generator 3. In FIG. 5, "○" represents a fact that the clutch C1, C2, C3, C4, C5 or the brake B1 is engaged to transmit the torque, and "X" represents a fact that the clutch C1, C2, C3, C4, C5 or the brake B1 is disengaged to interrupt the transmission of the torque.

The driving modes listed in FIG. 5 will be explained in more detail. As shown in FIG. 5, the first clutch C1, the fourth clutch C4 and the fifth clutch C5 are engaged under the 1st CVT mode in which the engine 1 is outputting the power. In this situation, the first motor generator 2 is controlled to serve as a generator, and an electromotive force of the first motor generator 2 is supplied to the second motor generator 3 to drive the second motor generator 3 as a motor. This situation is indicated in FIG. 6. As shown in FIG. 6, the torque of the engine 1 acts on the ring gear Rm in a positive direction, and to the contrary, a reaction torque of the first motor generator 2 acts in a negative direction on the sun gear Sm connected therewith through the fifth clutch C5. As a result, a synthesized torque of a torque of the above-mentioned torques and a torque generated by driving the second motor generator 3 as a motor appears on the carrier Cm. Specifically, the power outputted from the engine 1 is distributed to the first motor generator 2 side through the sun gear Sm, and to the intermediate shaft 8 side through the carrier Cm. The power distributed to the first motor generator 2 side is converted into an electric power, and then converted into a mechanical power again by the second motor generator 3 to be synthesized with the power distributed to the intermediate shaft 8. The power transmitted from the carrier Cm to the sun gear Sr of the speed change mechanism 14 through the intermediate shaft 8 is changed in accordance with a speed change ratio of the speed change mechanism 14, and outputted from the carrier Cr to the output member 15. As indicated in FIG. 6, since the speed change mechanism 14 functions as a speed reducing mechanism, the torque amplified in accordance with the speed change ratio appears on the output member 15.

Figure 7:
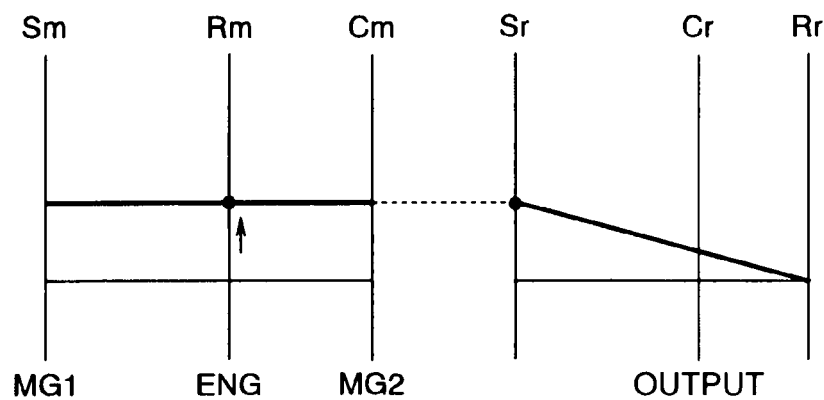
FIG. 7 is a nomographic diagram indicating an operating condition under the 1st+2nd fixed mode.

FIG. 6 indicates a state in which the vehicle is accelerated by the power outputted from the engine 1, that is, a so-called "power-on state". Specifically, as shown in FIG. 6, rotational speeds of the carrier Cm and the second motor generator 3 connected therewith are increased gradually in accordance with an increase in the vehicle speed, and to the contrary, rotational speeds of the sun gear Sm and the first motor generator 2 connected therewith are lowered gradually. During the process, the rotational speeds of those three rotary elements of the power distribution mechanism 4 such as the sun gear Sm, the carrier Cm and the ring gear Rm are synchronized. Such synchronized state is indicated in FIG. 7. As shown in FIG. 7, the power distribution mechanism 4 is rotated integrally, therefore, the rotational speed of the first clutch C1 connected with the carrier Cm and the rotational speed of the second clutch C2 connected with the sun gear Sm through the fifth clutch C5 are equalized, that is, synchronized. For this reason, the rotational speed will not be changed even if the second clutch C2 being disengaged is engaged. The driving mode achieved by thus engaging the second clutch C2 in addition to engaging the first clutch C1, the fourth clutch C4 and the fifth clutch C5 is the "1st+2nd fixed" mode under the engine running mode.

Specifically, since the fifth clutch C5 is being engaged, the two rotary element of the power distribution mechanism 4, that is, the carrier Cm is connected with the sun gear Sm if the first clutch C1 and the second clutch C2 are engaged. As a result, the power distribution mechanism 4 is rotated integrally. In this situation, the power outputted from the engine 1 is transmitted to the speed change mechanism 14 as it is. Therefore, the electrical controls of the first and the second motor generators 2 and 3 are interrupted, and those motor generators 2 and 3 run idle. This means that the power outputted from the engine 1 is transmitted to the speed change mechanism 14 without being converted into the electric power. The power of the engine 1 inputted to the sun gear Sr is changed by the speed change mechanism 14 in accordance with the speed change ratio (i.e., gear ratio) thereof, and outputted to the output member 15. Thus, the power outputted from the engine 1 is transmitted to the output member 15 through a mechanical means or mechanism without being converted into an electric power. This situation corresponds to the condition in which the power of the internal combustion engine is being transmitted to the output member without being converted into an electric power by the electric motors.

Figure 8:
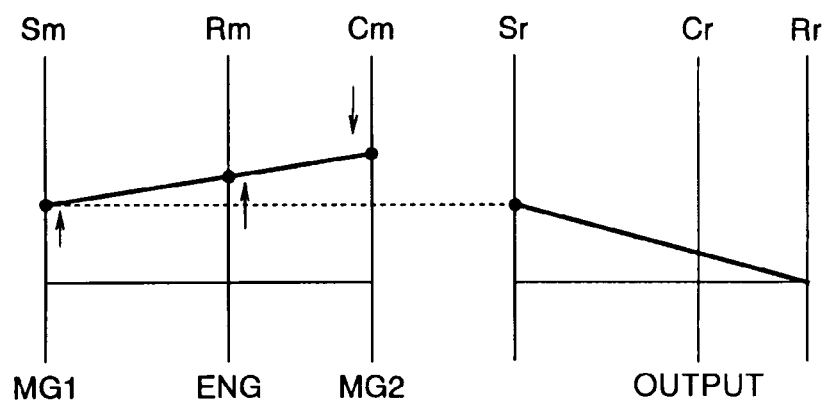
FIG. 8 is a nomographic diagram indicating an operating condition under the 2nd CVT mode.

The driving mode can be shifted from the "1st+2nd fixed" mode to the "2nd CVT" mode by disengaging the first clutch C1, while using the second motor generator 3 as a generator and driving the first motor generator 2 as a motor. This situation is indicated in FIG. 8. Under the "2nd CVT" mode, in the power distribution mechanism 4, the power outputted from the engine 1 is inputted to the ring gear Rm, the reaction torque of the second motor generator 3 acts on the carrier Cm, and the torque is outputted from the sun gear Sm and the torque of the first motor generator 2 is added to the sun gear Sm. The torque outputted from the sun gear Sm is transmitted to the sun gear Sr of the speed change mechanism 14 through the fifth clutch C5 and the second clutch C2. As the case of the "1st CVT mode", the speed change mechanism 14 amplifies the torque inputted to the sun gear Sr in accordance with the speed change ratio, and outputs the amplified torque to the output member 15 from the carrier Cr. Therefore, the rotational speed of the engine 1 can be changed by varying the rotational speed of the second motor generator 3. As a result, the total speed change ratio of the hybrid drive unit can be varied continuously (or steplessly).

Figure 9:
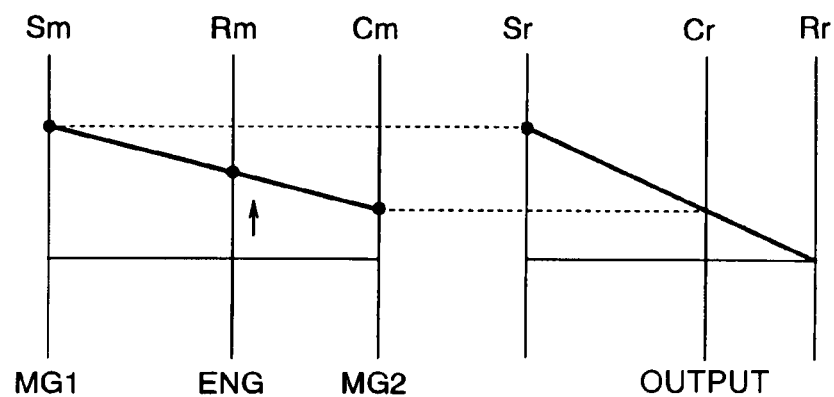
FIG. 9 is a nomographic diagram indicating an operating condition under the 2nd+3rd fixed mode.

In case the vehicle speed is increased under the "2nd CVT" mode shown in FIG. 8, the rotational speeds of the sun gear Sm and the first motor generator 2 connected therewith are increased gradually, and to the contrary, the rotational speeds of the carrier Cm and the second motor generator 3 connected therewith are lowered gradually. During the process, the rotational speeds of the carrier Cm of the power distribution mechanism 4 and the output member 15 are synchronized. Such synchronized state is indicated in FIG. 9. In this situation, the intermediate shaft 8 and the output member 15 connected by the third clutch C3 are rotated synchronously. Therefore, the rotational speed will not be changed even if the third clutch C3 being disengaged is engaged. The driving mode achieved by thus engaging the third clutch C3 in addition to engaging the second clutch C2, the fourth clutch C4 and the fifth clutch C5 is the "2nd+3rd fixed" mode under the engine running mode.

Under the "2nd+3rd fixed" mode, the carrier Cm of the power distribution mechanism 4 is substantially connected with the carrier Cr of the speed change mechanism 14, and the sun gear Sm of the power distribution mechanism 4 is substantially connected with the sun gear Sr of the speed change mechanism 14. As a result, a complex planetary gear mechanism or a speed change mechanism is formed by the double pinion type planetary gear mechanism functioning as the power distribution mechanism 4 and the single pinion type planetary gear mechanism functioning as the speed change mechanism 14, and the engine 1 is connected with the output member 15 through the complex planetary gear mechanism. Therefore, the rotational speed of the engine 1 is restricted by a rotational speed determined by the rotational speed of the output member 15 and the speed change ratio of the complex planetary gear mechanism. In other words, the engine 1 is connected mechanically with the output member 15 through the mechanical complex planetary gear mechanism. This situation corresponds to the condition in which the power of the internal combustion engine is being transmitted to the output member without being converted into an electric power by the electric motors. Therefore, the electrical controls of the first and the second motor generators 2 and 3 are interrupted, and those motor generators 2 and 3 run idle. This means that the power outputted from the engine 1 is transmitted to the output member 15 without being converted into the electric power.

Figure 10:
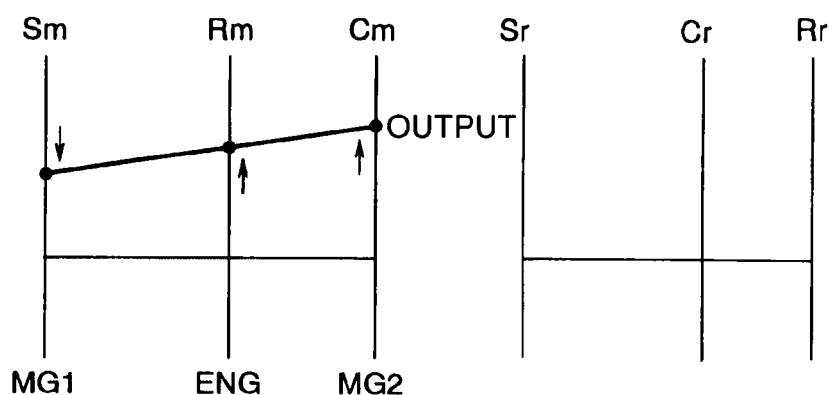
FIG. 10 is a nomographic diagram indicating an operating condition under the 3rd CVT mode.

The driving mode can be shifted from the "2nd+3rd fixed" mode to the "3rd CVT" mode by disengaging the fourth clutch C4 or by disengaging the second clutch C2 in addition to the clutch C4, while using the first motor generator 2 as a generator and driving the second motor generator 3 as a motor. This situation is indicated in FIG. 10. Under the "3rd CVT" mode, in the power distribution mechanism 4, the power outputted from the engine 1 is inputted to the ring gear Rm, the reaction torque of the first motor generator 2 acts on the sun gear Sm, and the torque is outputted from the carrier Cm and the torque of the second motor generator 3 is added to the carrier Cm. The torque outputted from the carrier Cm is transmitted to the output member 15 through the third clutch C3. Therefore, the rotational speed of the engine 1 can be changed by varying the rotational speed of the first motor generator 2. As a result, the total speed change ratio of the hybrid drive unit can be varied continuously (or steplessly).

Figure 11:
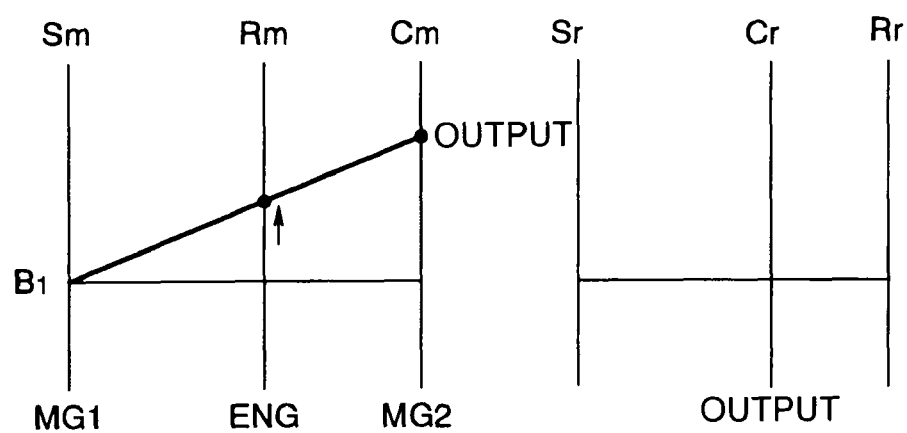
FIG. 11 is a nomographic diagram indicating an operating condition under the 3rd MG1 lock mode.

In case the vehicle speed is increased under the "3rd CVT" mode shown in FIG. 10, the rotational speeds of the carrier Cm and the second motor generator 3 connected therewith are increased gradually, and to the contrary, the rotational speeds of the sun gear Sm and the first motor generator 2 connected therewith are lowered gradually. Eventually, the rotations of the sun gear Sm and the first motor generator 2 connected therewith are stopped, in other words, the rotational speeds of the sun gear Sm and the first motor generator 2 become zero. This situation is indicated in FIG. 11. In this situation, since the fifth clutch C5 is engaged, the rotations of the sun gear Sm and the rotor shaft 10 are halted. As a result, the rotation of the brake B1 stops, that is, synchronized with the rotor shaft 10. Therefore, the rotational speed will not be changed even if the brake B1 being disengaged is engaged. The driving mode achieved by thus engaging the brake B1 in addition to engaging the third clutch C3 and the fifth clutch C5 is the "3rd MG1 lock" mode under the engine running mode.

Under the "3rd MG1 lock" mode, the sun gear Sm of the power distribution mechanism 4 is halted, and the power of the engine 1 is inputted to the ring gear Rm. Therefore, the power distribution mechanism 4 functions as a speed increasing mechanism which increases a speed derived from the power inputted from the engine 1 and outputs the power from the carrier Cm. The power outputted from the carrier Cm is transmitted to the output member 15 through the third clutch C3. Thus, the engine 1 is connected mechanically with the output member 15 through the power distribution mechanism 4 and the third clutch C3. That is, the "3rd MG1 lock" mode is an over drive stage in which the total speed change ratio is smaller than "1", and the power of the engine 1 is transmitted to the output member 15 without being converted into an electric power.

Thus, the motor generators 2 and 3 are shifted alternatively between a generator to serve as a reaction means and a motor to serve as a torque assist means, each time the driving mode is shifted under the condition in which the vehicle is driven by the power outputted from the engine 1. Therefore, the rotational speeds of the motor generators 2 and 3 can be prevented from being raised excessively even if the vehicle speed is increased.

Next, here will be explained driving modes under the "EV running mode" in more detail. As shown in FIG. 5, the "1st" mode is set by engaging the first clutch C1 and the fourth clutch C4. Specifically, under the "1st" mode, the intermediate shaft 8 integrated with the carrier Cm of the power distribution mechanism 4 is connected with the sun gear Sr of the speed change mechanism 14, and the carrier Cr of the speed change mechanism 14 is connected with the output member 15. Consequently, the second motor generator 3 is connected mechanically with the output member 15 through the speed reducing mechanism 6 and the speed change mechanism 14. In this situation, the output member 15 is rotated to drive the vehicle by driving the second motor generator 3 as a motor by the electric power of the electric storage device 30. In this case, a synthesized speed change ratio of the speed change ratio of the speed reducing mechanism 6 and the speed change ratio of the speed change mechanism 14 is the speed change ratio between the second motor generator 3 and the output member 15.

The "2nd" mode under the "EV running mode" is set by engaging the second clutch C2 and the fourth clutch C4. That is, under the "2nd" mode, the rotor shaft 10 integrated with the rotor of the first motor generator 2 is connected with the sun gear Sr of the speed change mechanism 14, and the carrier Cr of the speed change mechanism 14 is connected with the output member 15. Consequently, the first motor generator 2 is connected mechanically with the output member 15 through the speed change mechanism 14. In this situation, the output member 15 is rotated to drive the vehicle by driving the first motor generator 2 as a motor by the electric power of the electric storage device 30. In this case, the speed change ratio of the speed change mechanism 14 is the speed change ratio between the first motor generator 2 and the output member 15.

The "3rd" mode under the "EV running mode" is set by engaging the third clutch C3 only, or by engaging the third clutch C3 and the second clutch C2. Specifically, the intermediate shaft 8 integrated with the carrier Cm of the power distribution mechanism 4 is connected directly with the output member 15. Consequently, the second motor generator 3 is connected with the output member 15 mechanically through the speed reducing mechanism 6. In this situation, the output member 15 is rotated to drive the vehicle by driving the second motor generator 3 as a motor by the electric power of the electric storage device 30. In this case, the speed change ratio of the speed reducing mechanism 6 is the speed change ratio between the second motor generator 3 and the output member 15.

In case the "EV running mode", the fifth clutch C5 is thus disengaged under all of the driving modes. As a result, the sun gear Sm of the power distribution mechanism 4 runs idle. Therefore, the torque will not be transmitted between the engine 1 and the intermediate shaft 8, the rotor shaft 10 or the output member 15. That is, the engine 1 is disabled to output the power thereof to the output member 15, in other words, the engine 1 is disconnected from the output member 15. For this reason, the rotational speed of the output member 15 and the running condition of the vehicle will not be affected by the operating condition of the engine 1, for example, the rotational speed of the output member 15 and the running condition of the vehicle will not be changed even if the engine 1 is stopped, or even if the engine 1 runs idle.

As described, according to the hybrid drive unit to which the present invention is applied, the driving mode of the vehicle is thus shifted when the vehicle speed is changed through the fixed speed change ratio mode such as the "1st+2nd fixed" and the "2nd+3rd fixed" mode. As also described, under the fixed speed change ratio modes, the engine 1 is connected mechanically with the output member 15, in other words, the power of the engine 1 is transmitted to the output member 15 without being converted into an electric power by the first and the second motor generators 2 and 3. Therefore, the rotational speed of the engine 1 is governed by the vehicle speed and the total speed change ratio. For this reason, the rotational speed of the engine 1 may exceed an allowable rotational speed (or may go beyond an allowable range). However, the control unit according to the present invention is adapted to avoid such situation.

FIG. 1 is a flowchart explaining an example of a control to be carried out by the control system of the present invention. First of all, it is judged whether or not the driving mode is demanded to be shifted to a continuously variable speed change ratio mode through the fixed speed change ratio mode (at step S1). Here, the continuously variable speed change ratio mode is a driving mode in which the speed change ratio between the engine 1 and the output member 15 can be varied continuously or steplessly. Specifically, the continuously variable speed change ratio mode corresponds to the aforementioned "1st CVT" mode, "2nd CVT" mode and "3rd CVT" mode. Those driving modes are selected and set according to the driving condition of the vehicle such as the rotational speeds of the engine 1 and the motor generators 2 and 3, the vehicle speed, or a drive force demand. Therefore, the judgment at step S1 can be made by the aforementioned electronic control unit 31.

In case the driving mode is demanded to be shifted so that the answer of step S1 is YES, it is judged whether or not the engine 1 is ON, that is, it is judged whether or not the engine 1 is being driven (at step S2). Such judgment at step S2 can be made on the basis of the rotational speed of the engine 1, a control signal for feeding the fuel, an ignition control signal and so on. In case the engine 1 is being driven so that the answer of step S2 is YES, a driving condition of the vehicle such as information about the drive force demand, the vehicle speed, state of charge (SOC) of the electric storage device 30 and so on are obtained or read (at step S3). Then, it is judged whether or not the vehicle can be driven by any of the motor generators 2 and 3, that is, it is judged whether or not the "EV running" is possible (at step S4). The judgment at step S4 is made on the basis of the obtained information. For example, in case the vehicle speed is extremely high, in case the state of charge of the electric storage device 30 is lower than a predetermined threshold, or in case a failure of some kind is detected, the answer of step S4 will be NO. Otherwise, the answer of step S4 will be YES.

In case the "EV running" is possible so that the answer of step S4 is YES, it is predicted (or calculated) an operating point of the engine 1 of the case in which a transitional fixed speed change ratio mode during the speed change operation is set under the current driving condition (at step S5). The transitional fixed speed change ratio mode to be set can be determined easily from the fact that the speed change operation to be carried out is an upshifting from the current driving mode or a downshifting from the current driving mode. For example, in case the speed change operation to be carried out is an upshifting from the "1st CVT" mode, the fixed speed change ratio mode to be set is the "1st+2nd fixed" mode. To the contrary, in case the speed change operation to be carried out is a downshifting from the "3rd CVT" mode, the fixed speed change ratio mode to be set is the "2nd+3rd fixed" mode. As described, the speed change ratio under the fixed speed change ratio mode thus determined is governed by the gear ratio of the planetary gear mechanism functioning as the power distribution mechanism 4 (i.e., a ratio between the teeth number of the sun gear and the teeth number of the ring gear), and by the speed change ratio of the speed change mechanism 14. Accordingly, the rotational speed of the engine 1 or the operating point of the engine 1 can be calculated on the basis of the speed change ratio and the rotational speed of the output member 15 or the vehicle speed.

Then, it is judged whether or not the operating point of the engine 1 thus predicted enters into an "NV range", or whether or not the rotational speed of the engine 1 becomes lower than the minimum rotational speed (at step S6). Specifically, the "NV range" is a range where a noise and vibrations are deteriorated by a resonance of the engine 1 or the like, and the "NV range" is designed in advance in accordance with a required quality of the vehicle and so on.

Figure 2:
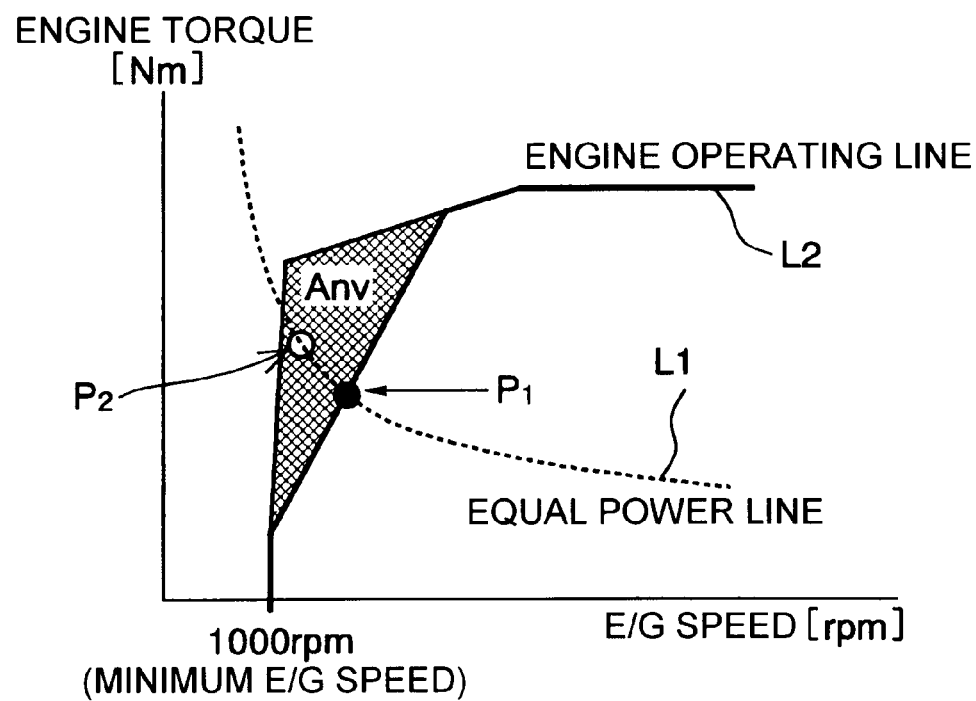
FIG. 2 is a diagram schematically showing an operating point of the engine, and noise and vibration range.

An example of the "NV range" is shown in FIG. 2. FIG. 2 is a diagram showing an operating point of the engine 1, and in FIG. 2, a vertical axis represents an engine torque, a horizontal axis represents a rotational speed of the engine 1, a line L1 is an equal power line, and a line L2 is an engine operating line. Specifically, the engine operating line L2 is a line connecting an operating point where the rotational speed of the engine 1 is minimum, an operating point where the rotational speed of the engine 1 is the lowest speed possible to keep noise and vibrations to an allowable level, and an operating point where fuel economy becomes optimum. The NV range Anv is located in a low speed side or high torque side of the engine operating line L2. In addition, the NV range Anv is located in a high speed side of the minimum rotational speed. Therefore, the engine 1 is driven on the engine operating line L2, or at an operating point in the high speed side or low torque side of the engine operating line L2.

The judgment of step S6 can be made on the basis of the above-explained map shown in FIG. 2. Specifically, at step S6, it is judged whether or not the operating point, which is determined on the basis of an engine torque estimated from an opening degree of a throttle or an accelerator, and on the basis of the rotational speed of the engine 1 under the predicted fixed speed change ratio mode, is situated in the low speed side or high torque side of the engine operating line L2.

In case the answer of step S6 is YES, namely, in case the rotational speed of the engine 1 goes beyond the allowable speed range under the transitional fixed speed change ratio mode set during the speed change operation, the running mode is switched to the EV running mode under the current driving mode (at step S7). Specifically: in case the answer of step S6 is YES under the "1st CVT" mode, the driving mode is shifted to the "1st" mode of the EV running mode; in case the answer of step S6 is YES under the "2nd CVT" mode, the driving mode is shifted to the "2nd" mode of the EV running mode; and in case the answer of step S6 is YES under the "3rd CVT" mode, the driving mode is shifted to the "3rd" mode of the EV running mode. As described, the engine 1 is disconnected from the output member 15 in any of those cases to be disabled to output the torque thereof to the output member 15.

In this situation, a speed change operation is carried out (at step S8). Specifically, a driving mode as the operating mode of the hybrid drive unit is shifted. The speed change operation at step S8 is carried out by setting the aforementioned fixed speed change ratio mode temporarily, and by switching an engagement status(es) of the predetermined clutch(es). In this case, the rotational speed of the intermediate shaft 8 or the rotor shaft 10 connected with the output shaft 15 has to be restricted by the rotational speed determined by the rotational speed of the output member 15 and the speed change ratio. However, since the engine 1 is not connected with those elements, the operating point of the engine 1 is prevented from entering into the NV range Anv, or the rotational speed of the engine 1 is prevented from being lowered to the speed lower than the minimum rotational speed. In other words, the speed change operation will not be restricted to avoid those undesirable operating condition of the engine 1.

Meanwhile, in case the answer of step 51 is NO, the routine advances to step S9 at which a normal speed change control is carried out. In this case, since the speed change is not demanded, the speed change operation will not be carried out even if the routine advances to step S9. In case the engine 1 is stopped so that the answer of step S2 is NO, the routine also advances to step S9 and the normal speed change control, that is, a shifting operation of the driving mode is carried out. This is because the running mode of the vehicle is the EV running mode. In case the EV running mode can not be achieved so that the answer of step S4 is NO, the routine also advances to step S9 and normal speed change control, that is, a shifting operation of the driving mode is carried out. In this case, if the speed change is demanded and the situation allows to carry out the speed change, a speed change operation is carried out. In case the answer of step S6 is NO, namely, in case the operating point of the engine 1 is judged not to enter into the NV range Anv and the rotational speed of the engine 1 is judged not to be lowered to the speed lower than the minimum speed, the routine also advances to step S9 and normal speed change control, that is, a shifting operation of the driving mode is carried out.

Figure 3:
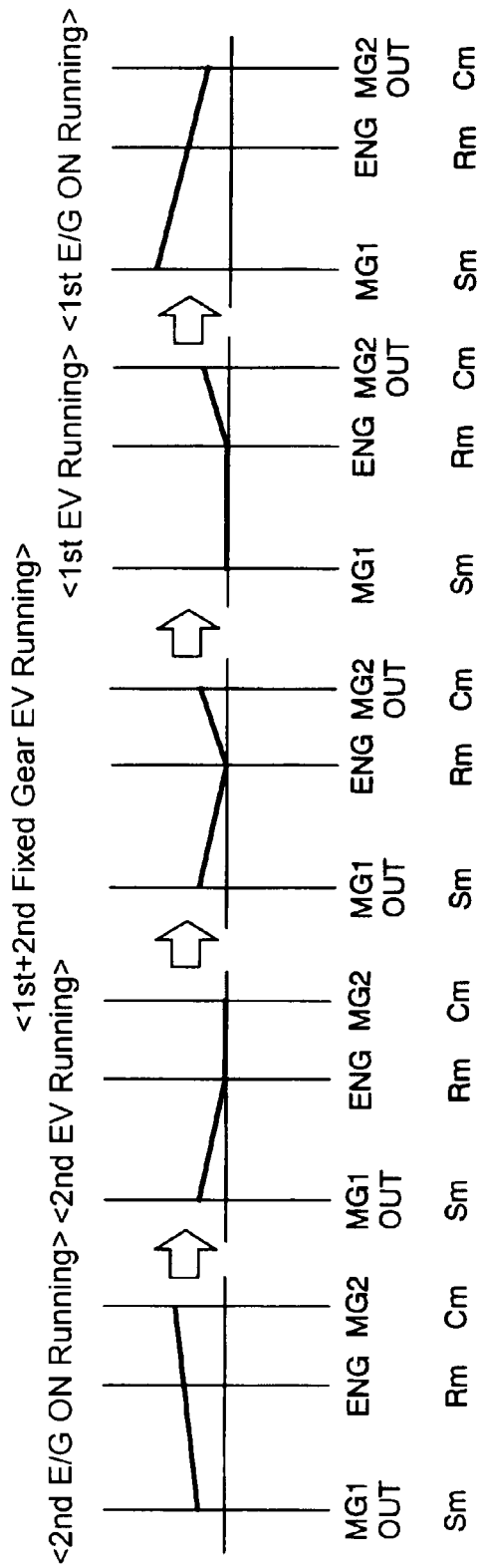
FIG. 3 is a nomographic diagram schematically showing a change in behavior of the power distribution mechanism during a shifting operation from the "2nd CVT" mode to the "1st" CVT mode.

FIG. 3 is a nomographic diagram showing a change in behavior of the power distribution mechanism 4 during a speed change operation from the "2nd CVT" mode to the "1st CVT" mode under the condition in which the vehicle is driven by driving the engine 1. Under the "2nd Engine ON running" mode, the torque from the engine 1 is inputted to the ring gear Rm, the reaction torque resulting from using the second motor generator 3 as a generator acts on the carrier Cm, and the torque of the first motor generator 2 driven as a motor by the electric power from the second motor generator 3 acts on the sun gear Sm.

In this situation, in case a judgment to carry out a downshifting to "1st CVT" mode, and for example, the operating point of the engine 1 is judged to enter into the NV range Anv, the running mode of the vehicle is shifted to the "2nd EV running" mode. Specifically, the fifth clutch C5 shown in FIG. 4 is disengaged, and the engine 1 is inactivated by e.g., interrupting a feeding of the fuel. As a result, although a load resulting from a generation is applied to the second motor generator 3, a power for generating the electric power is not inputted thereto. Therefore, the second motor generator 3 is stopped, and the rotation of the ring gear Rm connected therewith is stopped consequently. Also, the rotations of the ring gear Rm and the sun gear Sm are stopped. In this situation, the torque of the first motor generator 2 functioning as a motor is transmitted to the sun gear Sr of the speed change mechanism 14, and the torque is outputted to the output member 15 thorough the speed change mechanism 14. As a result, the vehicle is driven by the power of the first motor generator 2. Here, in the nomographic diagram showing "2nd EV running" mode, the rotational speed of the first motor generator 2 is indicated.

Then, the "1st+2nd fixed gear EV running" mode is set under the EV running mode in which the engine 1 is inactivated. Specifically, the first clutch C1 is engaged in addition to the second clutch C2 and the fourth clutch C4. In order to avoid or mitigate a shock resulting from engaging the first clutch C1, it is preferable to synchronize the first clutch C1 by controlling the rotational speed of the second motor generator when engaging the first clutch C1.

Thus, under the "1st+2nd fixed gear EV running" mode, both of the first and the second motor generators 2 and 3 are connected with the sun gear Sr functioning as an input element of the speed change mechanism 14. Therefore, the running mode of the vehicle is eventually shifted to the "1st EV running" mode in which the vehicle is driven by the power of the second motor generator 3 instead of the power of the first motor generator 2, by lowering the torque inputted from the first motor generator 3, and by increasing the torque from the second motor generator 3 thereby compensating the lowered torque of the first motor generator 3.

Then, under the condition in which the engine 1 is driven, the rotational speed of the engine 1 is controlled by the first motor generator 2, by synchronizing and engaging the fifth clutch C5 by controlling the rotational speed of the first motor generator 2. As a result, the "1st CVT" mode (corresponding to the "1st Engine ON running" mode is set.

Thus, according to the control system of the present invention, the engine can be disconnected from the output member 15 under the fixed speed change ratio mode to be set during the shifting operation. Therefore, in case of shifting from the "2nd CVT" mode to the "1st CVT" mode for example, the operating point of the engine 1 can be kept to a 2nd CVT mode operating point as represented by P1 in FIG. 2. To the contrary, if the speed change is carried out while connecting the engine 1 with the output member 15, the rotational speed of the engine 1 is lowered in case the vehicle speed is low. As a result, the operating point of the engine 1 enters into the NV range Anv. However, according to the control system of the present invention, a shifting of the driving mode, that is, a speed change operation can be carried out without being restricted by the operating point of the engine 1.

Additionally, in case the rotational speed of the engine 1 will not go beyond the allowable speed range, the normal speed change operation is carried out as explained with reference to FIG. 1, and the engine 1 will not be disabled to transmit the power thereof to the output member 15. Therefore, the speed change control can be facilitated and a response of the speed change operation can be improved.

Here will be explained a relation between the example thus has been explained and the present invention. The functional means for carrying out the control at steps S7 and S8 corresponds to the first speed change control means of the present invention, the functional means for carrying out the control at step S9 corresponds to the second speed change control means of the present invention, the functional means for carrying out the control at step S6 corresponds to the selecting means of the present invention, and the functional means for carrying out the control at step S5 corresponds to the detecting means of the present invention.

The present invention should not be limited to the example thus has been explained, and the control system of the present invention may be applied to a hybrid drive unit other than the hybrid drive unit shown in FIG. 4. For example, a speed change mechanism adapted to set a plurality of speed change ratios selectively, a complex planetary gear mechanism formed by combining a plurality of the planetary gear mechanisms may be used as the speed change mechanism. Otherwise, a Ravigneaux type planetary gear mechanism, or a speed change mechanism adapted to select a plurality of gear pairs by a clutch mechanism may also be used as the speed change mechanism. In addition, according to the present invention, it is also possible to arrange a starting clutch in the output side of the internal combustion engine. In this case, the internal combustion engine may also be disconnected from the output member by disengaging the starting clutch, when setting the fixed speed change ratio mode as a transitional mode during the speed change operation.

The invention claimed is:

1. A control system for a hybrid drive unit having an internal combustion engine, and first and second electric motors capable of generating electric power, comprising:
   a power distribution mechanism comprising three rotary elements rotated differentially amongst each other including a first rotary element to which a power of the internal combustion engine is transmitted, a second rotary element to which a power of the first electric motor is transmitted, and a third rotary element to which a power of the second electric motor is transmitted;
   a speed change mechanism capable of setting a first speed change mode in which the power transmitted from the second rotary element is outputted to an output member, and a second speed change mode in which the power transmitted from the third rotary element is outputted to the output member; and
   a first speed change control means, which sets an electric vehicle running mode by temporarily disabling the internal combustion engine to transmit the power thereof to the output member while transmitting the power outputted from any of the electric motors to the output member instead of transmitting the power of the internal combustion engine, in case of shifting the speed change mode of the speed change mechanism under a condition in which the power of the internal combustion engine is being transmitted to the output member without being converted into an electric power by the electric motors.

2. The control system for a hybrid drive unit as claimed in claim 1, further comprising:
   a second speed change control means, which keeps the internal combustion engine being driven in case of shifting the speed change mode of the speed change mechanism under the condition in which the power of the internal combustion engine is being transmitted to the output member without being converted into an electric power by the electric motors; and
   a selecting means, which selects one of the first speed change control means and the second speed change control means to shift the speed change mode, on the basis of a driving condition of the hybrid drive unit.

3. The control system for a hybrid drive unit as claimed in claim 2, further comprising:
   a detecting means, which detects a fact that an operating condition of the internal combustion engine goes beyond a predetermined allowable vibrational noise range, or a fact that a rotational speed of the internal combustion engine becomes lower than a predetermined allowable lowest rotational speed, in case of shifting the speed change mode of the speed change mechanism under a condition in which the power of the internal combustion engine is being transmitted to the output member without being converted into an electric power by the electric motors; and wherein the selecting means includes a means which selects the first speed change control means to shift the speed change mode, in case the detecting means detects the fact that the operating condition of the internal combustion engine goes beyond the predetermined allowable vibrational noise range or the fact that the rotational speed of the internal combustion engine becomes lower than the predetermined allowable lowest rotational speed, when shifting the speed change mode of the speed change mechanism under the condition in which the power of the internal combustion engine is being transmitted to the output member without being converted into an electric power by the electric motors.

4. The control system for a hybrid drive unit as claimed in claim 3, wherein:

the power distribution mechanism is a double pinion type planetary gear mechanism comprising: a first sun gear as an external gear, to which the power of the first electric motor is transmitted; a first ring gear as an internal gear, which is arranged concentrically with the first sun gear, and to which the power of the internal combustion engine is transmitted; and a first carrier, which holds a pinion gear meshing with the first sun gear and an another pinion gear meshing with the pinion gear and the first ring gear, and to which the power of the second electric motor is transmitted;

the speed change mechanism comprises: a single pinion type planetary gear mechanism comprising a second sun gear as an external gear, a second ring gear which is arranged fixedly and concentrically with the second sun gear, and a second carrier which holds a pinion gear meshing with the second sun gear and the second ring gear; a first clutch, which connects the second sun gear selectively with the first carrier; a second clutch, which connects the second sun gear selectively with the first electric motor; a third clutch, which connects the second carrier selectively with the output member; a fourth clutch, which connects the second carrier selectively with the output member; and the hybrid drive unit further comprises: a fifth clutch, which connects the first electric motor selectively with the first sun gear; and a brake, which halts the first electric motor selectively.

5. The control system for a hybrid drive unit as claimed claim 4, wherein:

the internal combustion is disabled to transmit the power thereof to the output member by halting combustion of fuel, or by disconnecting a transmission of the torque between the internal combustion engine and the output member.

6. The control system for a hybrid drive unit as claimed in claim 4, wherein:

the first speed change control means includes a means which disconnects the first electric motor from the first sun gear by disengaging the fifth clutch.

7. The control system for a hybrid drive unit as claimed in claim 3, wherein:

the internal combustion is disabled to transmit the power thereof to the output member by halting combustion of fuel, or by disconnecting a transmission of the torque between the internal combustion engine and the output member.

8. The control system for a hybrid drive unit as claimed in claim 2, wherein:

the power distribution mechanism is a double pinion type planetary gear mechanism comprising: a first sun gear as an external gear, to which the power of the first electric motor is transmitted; a first ring gear as an internal gear, which is arranged concentrically with the first sun gear, and to which the power of the internal combustion engine is transmitted; and a first carrier, which holds a pinion gear meshing with the first sun gear and an another pinion gear meshing with the pinion gear and the first ring gear, and to which the power of the second electric motor is transmitted;

the speed change mechanism comprises: a single pinion type planetary gear mechanism comprising a second sun gear as an external gear, a second ring gear which is arranged fixedly and concentrically with the second sun gear, and a second carrier which holds a pinion gear meshing with the second sun gear and the second ring gear; a first clutch, which connects the second sun gear selectively with the first carrier; a second clutch, which connects the second sun gear selectively with the first electric motor; a third clutch, which connects the second carrier selectively with the output member; a fourth clutch, which connects the second carrier selectively with the output member; and the hybrid drive unit further comprises: a fifth clutch, which connects the first electric motor selectively with the first sun gear; and a brake, which halts the first electric motor selectively.

9. The control system for a hybrid drive unit as claimed claim 8, wherein:

the internal combustion is disabled to transmit the power thereof to the output member by halting combustion of fuel, or by disconnecting a transmission of the torque between the internal combustion engine and the output member.

10. The control system for a hybrid drive unit as claimed in claim 8, wherein:

the first speed change control means includes a means which disconnects the first electric motor from the first sun gear by disengaging the fifth clutch.

11. The control system for a hybrid drive unit as claimed claim 2, wherein:

the internal combustion is disabled to transmit the power thereof to the output member by halting combustion of fuel, or by disconnecting a transmission of the torque between the internal combustion engine and the output member.

12. The control system for a hybrid drive unit as claimed in claim 1, wherein:

the power distribution mechanism is a double pinion type planetary gear mechanism comprising: a first sun gear as an external gear, to which the power of the first electric motor is transmitted; a first ring gear as an internal gear, which is arranged concentrically with the first sun gear, and to which the power of the internal combustion engine is transmitted; and a first carrier, which holds a pinion gear meshing with the first sun gear and an another pinion gear meshing with the pinion gear and the first ring gear, and to which the power of the second electric motor is transmitted;

the speed change mechanism comprises: a single pinion type planetary gear mechanism comprising a second sun gear as an external gear, a second ring gear which is arranged fixedly and concentrically with the second sun gear, and a second carrier which holds a pinion gear meshing with the second sun gear and the second ring gear; a first clutch, which connects the second sun gear selectively with the first carrier; a second clutch, which connects the second sun gear selectively with the first electric motor; a third clutch, which connects the second carrier selectively with the output member; a fourth clutch, which connects the second carrier selectively with the output member; and the hybrid drive unit further comprises: a fifth clutch, which connects the first electric motor selectively with the first sun gear; and a brake, which halts the first electric motor selectively.

13. The control system for a hybrid drive unit as claimed in claim 12, wherein:

the first speed change control means includes a means which disconnects the first electric motor from the first sun gear by disengaging the fifth clutch.

14. The control system for a hybrid drive unit as claimed in claim 12, wherein:

the internal combustion is disabled to transmit the power thereof to the 5 output member by halting combustion of fuel, or by disconnecting a transmission of the torque between the internal combustion engine and the output member.

15. The control system for a hybrid drive unit as claimed in claim 1, wherein:

the internal combustion is disabled to transmit the power thereof to the output member by halting combustion of fuel, or by disconnecting a transmission of the torque between the internal combustion engine and the output member.

16. The control system for a hybrid drive unit as claimed in claim 1, further comprising:

a clutch, which connects any one of the second rotary element and the third rotary element selectively with the speed change mechanism; and an another clutch, which connects the remaining second or third rotary element selectively with the speed change mechanism or the output member.

\* \* \* \* \*